Oct. 6, 1925.

R. J. N. SIMPSON 1,555,884

GRAIN CAR DOOR

Filed April 11, 1925

INVENTOR.
R. J. N. Simpson.
BY J. Edward Maybee.
ATTY.

Patented Oct. 6, 1925.

1,555,884

UNITED STATES PATENT OFFICE.

RICHARD J. N. SIMPSON, OF SARNIA, ONTARIO, CANADA.

GRAIN-CAR DOOR.

Application filed April 11, 1925. Serial No. 22,471.

*To all whom it may concern:*

Be it known that I, RICHARD J. N. SIMPSON, of the city of Sarnia, in the county of Lambton, Province of Ontario, Canada, have invented certain new and useful Improvements in Grain-Car Doors, of which the following is a specification.

This invention relates to doors of cars for carrying grain. Such doors must of necessity have certain characteristics, viz first, that they prevent the escape of grain through the opening in the side of the car; second, that they may be readily moved to a partially open position to permit the unloading of the grain lying in proximity to the door; third, that they may be moved entirely out of the way when the remainder of the grain is being unloaded, fourth, that the door will always be conveniently handy and readily placed in closed position when it is again desired to load the car with grain; and fifth, that doors constructed to meet the foregoing requirements may be installed at a reasonable expense.

My object therefore, is to devise a grain car door which will satisfactorily meet these requirements.

I attain my object by means of the constructions hereinafter described and illustrated in the accompanying drawings in which—

Figure 1:
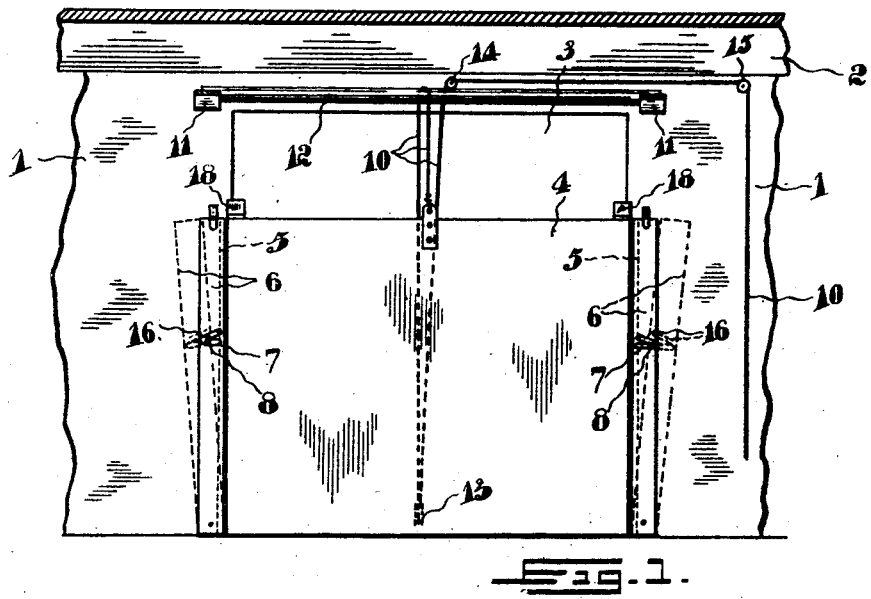
Figures 2, 3:
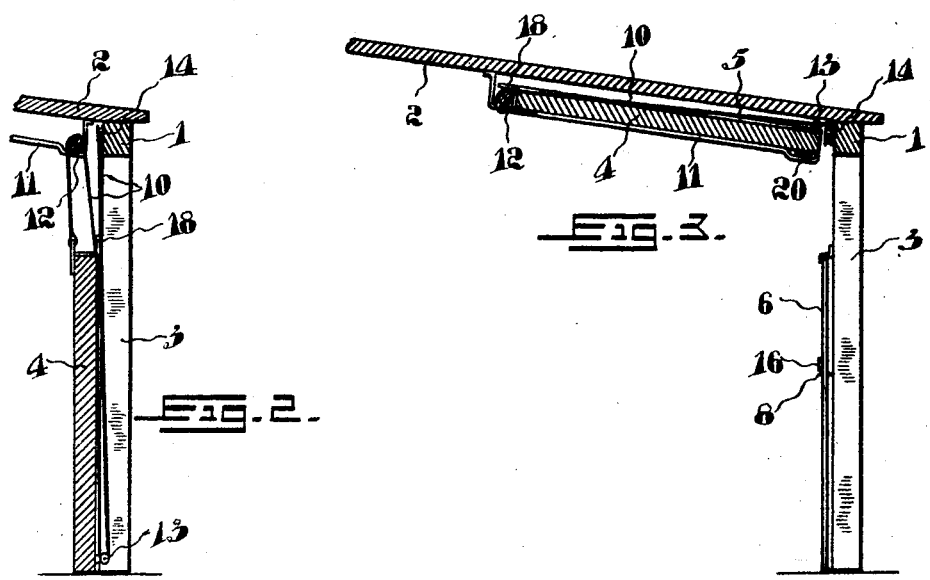

Fig. 1 is an elevation looking at the inner side of the door, the latter being in closed position;

Fig. 2 a side elevation of the same; and

Fig. 3 a similar view showing the door in raised position.

In the drawings like numerals of reference indicate corresponding parts in the different figures.

1 is the side of the car, 2 the roof, and 3 the opening in the side. 4 is the door. This door is provided with flange members 5 which are engaged by securing members 6 to hold the door in closed position. Each of these securing members 6 is pivoted at its lower end to the side of the car, its upper end being adapted to be swung in the plane of the side of the car as indicated in dotted lines, to disengage its upper end from the flange member 5. Each securing member 6 is provided with a slot 7 through which extends a pin 8 so that the swing of the member 6 in either direction is limited. Guides 9 are provided on the side of the car for the upper end of the securing members 6. A stop member 16 is pivoted on each securing member 6, which stop members are adapted to engage behind the pins 8 when the securing members are in door retaining position.

To the upper edge of the door is secured one end of a chain or cable 10 by means of which the door may be raised.

To the roof of the car are secured tracks 11 for the roller 12. The cable 10 passes first over the roller 12, then back through a guide 13 formed on the front of the door adjacent the top, then around a guide pulley 14 provided on the front of the door adjacent its bottom, and then up over a guide pulley 15 provided inside the car adjacent the roof, and thence to a convenient point for operation at one side of the doorway.

It will be noted that the door is provided with metal braces 17, the upper ends of these braces being formed with extensions 18 above the door for a purpose which will hereinafter appear.

The door is operated as follows. Assuming the car to be full of grain which it is desired to unload, by pulling on the cable 10 the door is first moved upwardly in the plane of the side of the car allowing grain to escape beneath the bottom of the door. When sufficient grain has escaped so that there is no pressure on the door from within, the door is raised by continued pull on the cable until the extensions 18 engage behind the roller 12. The locking members 16 are disengaged from the pins 8, and the securing members 6 are swung on their pivots until their upper ends are out of engagement with the flanges 5. By continuing the pull on the cable, the door is moved upwardly and inwardly to the position shown in Fig. 3, the upper part of the door shoving the roller 12 along the guides and being supported from said roller 12 by means of the extensions 18. A bar 20 is then placed on the guides adjacent the doorway for supporting the lower part of the door.

When the door is to be replaced in position the bar 20 is removed, and the cable released, allowing the door to be moved back until it lies in position at the door opening, when the securing members are then moved to their securing position and the locking members 16 are engaged with the pins 8.

To prevent accidental slipping of the roller 12 when the door is in closed position, the tracks 11 are recessed at their lower ends to receive the ends of the roller, while when the door is in raised or open position the ends of the bar 20 are received in these recesses.

From the above description it will be seen that I have devised a construction of grain door which will satisfactorily attain the object of my invention as set out in the preamble of this specification.

What I claim is:

1. A car having a door opening; a securing guide at each side of said opening; a door vertically slidable in said guides; a pair of spaced tracks secured to the underside of the roof of the car; a member supported by and extending from track to track and movable longitudinally thereon, the upper part of said door being adapted to engage and be carried by said member as the latter moves along the tracks; and means for actuating said door.

2. A car having a door opening; a securing guide at each side of said opening; a door vertically slidable in said guides, each of said guides being pivotally connected at its lower end to the side of the car whereby it may swing in the plane of the side of the car; a trackway secured to the underside of the roof of the car; a member movable on said trackway, the upper part of said door being adapted to engage and be carried by said member as the latter moves along the trackway; and means for actuating said door.

3. A car having a door opening; a securing guide at each side of said opening; a door vertically slidable in said guides, each of said guides being pivotally connected at its lower end to the side of the car whereby it may swing in the plane of the side of the car; means for locking said guides in door supporting position; a trackway secured to the underside of the roof of the car; a member movable on said trackway, the upper part of said door being adapted to engage and be carried by said member as the latter moves along the trackway; and means for actuating said door.

4. A car having a door opening; a securing guide at each side of said opening; a door vertically slidable in said guides, each of said guides being pivotally connected at its lower end to the side of the car whereby it may swing in the plane of the side of the car, each of said guides having a slot formed therein; a pin on the side of the car extending through said slot whereby the swing of the guide is limited; a trackway secured to the underside of the roof of the car; a member movable on said trackway, the upper part of said door being adapted to engage and be carried by said member as the latter moves along the trackway; and means for actuating said door.

5. A car having a door opening; a securing guide at each side of said opening; a door vertically slidable in said guides, each of said guides being pivotally connected at its lower end to the side of the car whereby it may swing in the plane of the side of the car, each of said guides having a slot formed therein; a pin on the side of the car extending through said slot whereby the swing of the guide is limited; locking members pivoted on said guides adapted to engage said pins to retain the guides in door supporting position; a trackway secured to the underside of the roof of the car; a member movable on said trackway, the upper part of said door being adapted to engage and be carried by said member as the latter moves along the trackway; and means for actuating said door.

6. A car having a door opening; a securing guide at each side of said opening; a door vertically slidable in said guides; a trackway secured to the underside of the roof of the car; a member movable on said trackway, the upper part of said door being adapted to engage and be carried by said member as the latter moves along the trackway; a guide pulley adjacent the lower part of the door; a second guide pulley above the door opening; and a cable for actuating the door, said cable having one end connected to the upper part of the door, then passing over the member movable on the trackway, then around the guide pulley on the door, and then over the guide pulley over the doorway.

Signed at Sarnia, Ontario, this 31st day of March, 1925.

RICHARD J. N. SIMPSON.